Jan. 21, 1930.    T. S. KEMBLE    1,744,168
SPRING MOUNTING FOR AUTO BUSSES, TRUCKS, ETC
Original Filed July 2, 1924
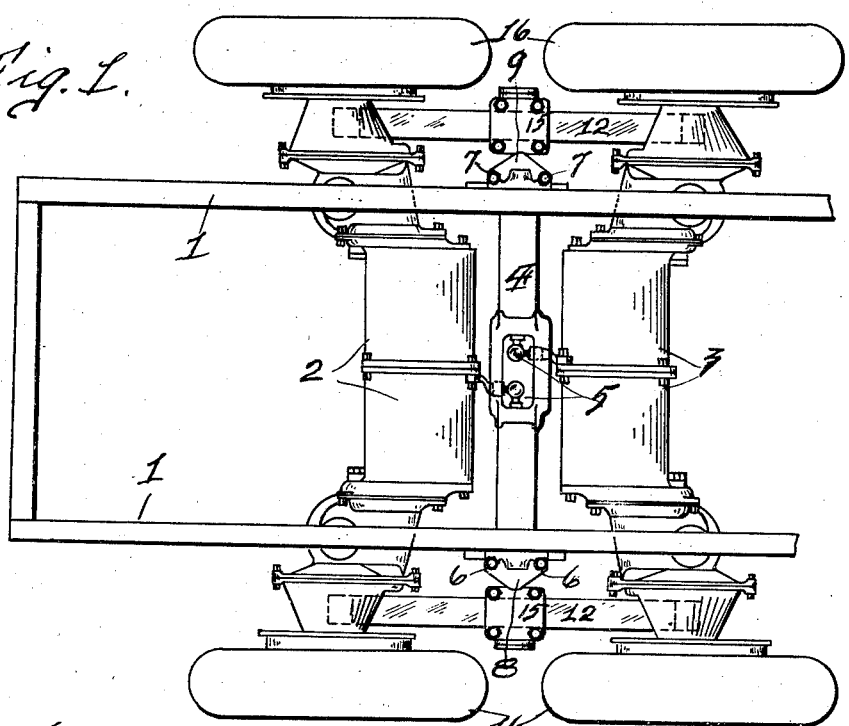
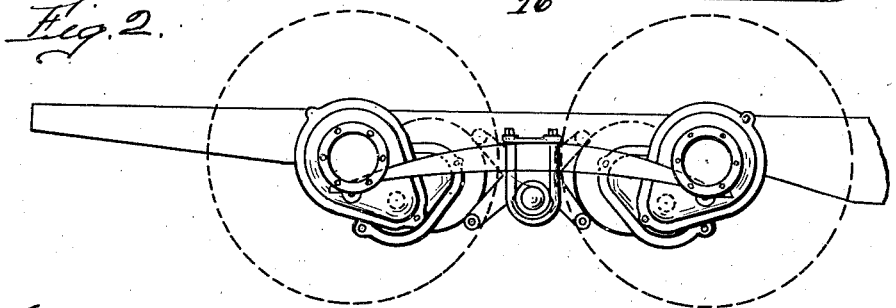
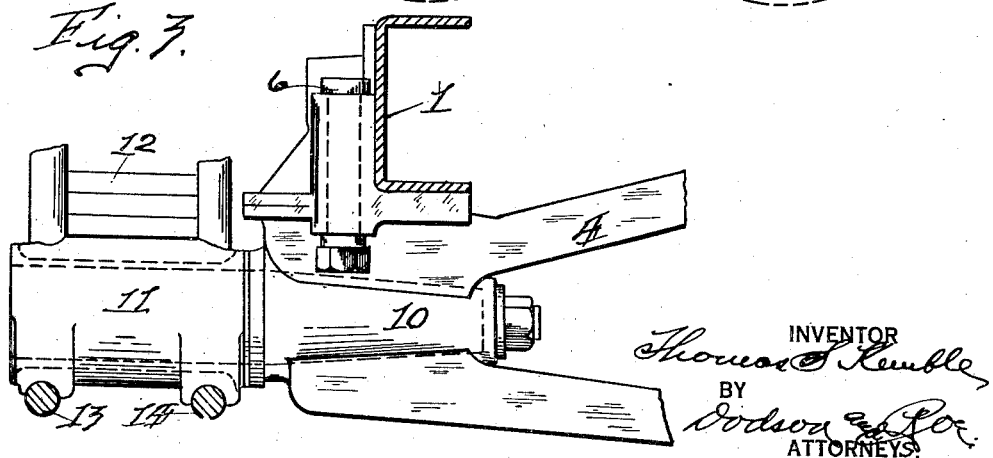
INVENTOR
Thomas S. Kemble
BY
Dodson
ATTORNEYS Patented Jan. 21, 1930

1,744,168

UNITED STATES PATENT OFFICE

THOMAS S. KEMBLE, OF LAKEWOOD, OHIO, ASSIGNOR TO UNIVERSAL GAS ELECTRIC COMPANY, OF LAWRENCE, KANSAS, A CORPORATION OF DELAWARE

SPRING MOUNTING FOR AUTO BUSSES, TRUCKS, ETC.

Original application filed July 2, 1924, Serial No. 723,772. Divided and this application filed June 13, 1927.
Serial No. 198,662.

My invention relates especially to busses, employed for the transportation of persons, both in the city and in interurban traffic, in which two pairs of axles are mounted in tandem, as in the rear driving assembly of six-wheel vehicles and is a division of my co-pending application, Serial Number 723,772. It is well known, to persons skilled in the art, that in these vehicles in which the drive is carried through the springs, when the brakes are applied harshly, there is a tendency for the rearward axle to rise from the ground, or to "rear", and that this tendency reduces the possible braking effort at this axle and throws an undue braking service on the forward axle. It has the reverse effect when driving forward, and in either case tends to cause slipping between the ground and the wheels on the axle which is tending to "rear". It may also have an undesirable effect upon the "riding qualities" of the vehicle.

My invention has for its object, to provide for the location of the spring pivots lower than the wheel axle centers, thus reducing this well known tendency of the rear truck to rear.

This construction permits the manufacture of a truck having a minimum ground clearance, for as the body moves down (relative to the axle), the motor moves down a less distance, thus approaching the body or chassis, and the clearance between the chassis and the road need be only the difference between the vertical motion of the motor and body, plus a slight clearance between the motor and body of chassis, plus the vertical depth of the motor, plus the minimum temporary ground clearance; whereas in the standard practice, the clearance between the body and road must be the vertical motion of the body relative to the road, plus the slight clearance between the motor and body, plus the vertical depth of the motor, plus the maximum permanent ground clearance.

It will be obvious, to persons skilled in the art, that locating the spring eye below the center wheel reduces the torque reaction at the torque ball. Furthermore, the spring acts as a radius rod counter-balancing the tractive effort, for, obviously, if it were possible to locate the spring eye on the ground, there would be no torque reaction at the ball.

My means of accomplishing the foregoing objects may be more readily understood by having reference to the accompanying drawings, which are hereunto annexed and are a part of this specification, in which—

Fig. 1 is a plan view of a fragmentary portion of a chassis equipped with my improved spring mounting;

Fig. 2 is a side elevation of the same; and

Fig. 3 is an enlarged detail view, showing my manner of mounting the spring on the cross member of the chassis.

Similar reference numerals refer to similar parts throughout the entire description.

As shown in the drawings, the chassis 1 is provided with a four-wheel electric drive, consisting of two pair of electric motors, 2 and 3, which are secured to a cross-frame member 4 through a torque system 5, this drive forming the subject matter of my co-pending application, Serial No. 723,772, of which this is a division.

The motors 2 and 3 drive the wheels 16, through a train of gears (not shown) the motor frames and gear casing forming the load-carrying axles. The cross member 4 is secured to the chassis 1 by means of bolts 6 and 7, which pass through brackets 8 and 9 which are riveted, or otherwise secured, to the chassis 1. A longitudinal bearing 10 is formed in each end of the cross member 4. A trunnion or pivot 11 is mounted in said bearing 10, and the springs 12 are secured thereto by means of U-bolts 13 and 14, which pass around a bearing mounted on the trunnion 11 and then through a spring plate 15. The ends of the springs 12 are suitably secured directly to the axles.

From the foregoing description, it will be apparent that the spring pivot is much lower than the center of the wheels 16, and that by this type of construction I secure the desirable results set forth as the objects of my invention.

While I have illustrated and described specific details it should be understood that this is done solely for the purpose of setting forth a concrete embodiment of my invention, and not at all with the intention of limiting myself to such details, as obviously many changes in construction may be made and still embody my invention of locating the spring pivot or mounting below the center of the wheels of the vehicle.

Having described my invention, what I regard as new, and desire to secure by Letters Patent of the United States, is:

1. In a vehicle two driving axles, arranged in tandem, wheels on said axles, a pair of springs mounted adjacent the ends of said axles, and secured directly thereto, a pair of trunnions mounted lower than the centers of the wheels, said springs being mounted on said trunnions, the connections between the axles, springs and trunnions being arranged to transmit the driving and braking effort between said vehicle and said axles.

2. In a vehicle having a chassis with side and cross frame members, a drive comprising two driving axles arranged in tandem, wheels on said axles, a pair of trunnions mounted in said cross member, below the center of the said wheels, a spring pivotally secured to each trunnion, the ends of each of the springs being secured directly to its adjacent axle, said springs and trunnions being arranged to transmit the driving and braking effort between said vehicle and said axles.

THOMAS S. KEMBLE.